(12) United States Patent
Mizunuma et al.

(10) Patent No.: US 11,281,324 B2
(45) Date of Patent: Mar. 22, 2022

(54) INFORMATION PROCESSING APPARATUS, INFORMATION PROCESSING METHOD, AND PROGRAM INPUTS TO A GRAPHICAL USER INTERFACE

(71) Applicant: SONY CORPORATION, Tokyo (JP)

(72) Inventors: Hiroyuki Mizunuma, Tokyo (JP); Kazuyuki Yamamoto, Kanagawa (JP); Nariaki Satoh, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/260,204

(22) Filed: Sep. 8, 2016

(65) Prior Publication Data

US 2016/0378248 A1 Dec. 29, 2016

Related U.S. Application Data

(63) Continuation of application No. 13/297,777, filed on Nov. 16, 2011, now abandoned.

(30) Foreign Application Priority Data

Dec. 1, 2010 (JP) .............................. JP2010-268479

(51) Int. Cl.
*G06F 3/041* (2006.01)
*G06F 3/0488* (2013.01)
(Continued)

(52) U.S. Cl.
CPC .......... *G06F 3/0416* (2013.01); *G06F 3/0412* (2013.01); *G06F 3/04883* (2013.01);
(Continued)

(58) Field of Classification Search
CPC ...... G06F 3/041; G06F 3/0416; G06F 3/0412; G06F 3/0488; G06F 3/04883;
(Continued)

(56) References Cited

U.S. PATENT DOCUMENTS 8,054,296 B2 11/2011 Land et al.
8,436,821 B1 * 5/2013 Plichta ................ G06F 3/04883
345/156
(Continued)

FOREIGN PATENT DOCUMENTS

JP 2009-522669 6/2009
KR 20120041966 A * 5/2012 ........... G06F 3/0412

OTHER PUBLICATIONS

English-language Abstract of International Patent Application No. PCT/US2006/062759, filed Dec. 29, 2006.

*Primary Examiner* — Jennifer Mehmood
*Assistant Examiner* — Donna J. Ricks
(74) *Attorney, Agent, or Firm* — Paratus Law Group, PLLC

(57) ABSTRACT

An apparatus including a memory storing instructions and a control unit executing the instructions is provided. The control unit is configured to send signals to display first and second indicators on a display device. The control unit is further configured to receive first and second user inputs and, in response to the received inputs, to send signals to change a display state of the first indicator according to the first input. The control unit is further configured to send signals to change a display state of the second indicator according to the second input and initiate an operation to be performed based on a combination of the first and second inputs.

22 Claims, 16 Drawing Sheets

(51) Int. Cl.
*G09G 5/14* (2006.01)
*G06F 3/04886* (2022.01)
*G06F 3/04883* (2022.01)

(52) U.S. Cl.
CPC .............. *G06F 3/04886* (2013.01); *G06F 2203/04104* (2013.01); *G06F 2203/04105* (2013.01); *G06F 2203/04108* (2013.01); *G06F 2203/04803* (2013.01); *G09G 5/14* (2013.01)

(58) Field of Classification Search
CPC ....... G06F 3/04886; G06F 2203/04104; G06F 2203/04105; G06F 2203/04108; G06F 2203/04803; G09G 5/14
See application file for complete search history.

(56) References Cited

U.S. PATENT DOCUMENTS

| | | | |
|---|---|---|---|
| 2005/0012723 A1* | 1/2005 | Pallakoff | G06F 1/1616 345/173 |
| 2005/0162402 A1 | 7/2005 | Watanachote | |
| 2007/0152984 A1* | 7/2007 | Ording | G06F 3/04845 345/173 |
| 2007/0177804 A1 | 8/2007 | Elias et al. | |
| 2008/0005703 A1 | 1/2008 | Radivojevic et al. | |
| 2008/0036743 A1* | 2/2008 | Westerman | G06F 3/038 345/173 |
| 2008/0168403 A1 | 7/2008 | Westerman et al. | |
| 2009/0021475 A1 | 1/2009 | Steinle et al. | |
| 2009/0051671 A1 | 2/2009 | Konstas | |
| 2009/0073194 A1 | 3/2009 | Ording | |
| 2009/0201261 A1* | 8/2009 | Day | G06F 3/04883 345/173 |
| 2011/0043527 A1 | 2/2011 | Ording et al. | |
| 2011/0050576 A1* | 3/2011 | Forutanpour | G06F 3/0488 345/168 |
| 2011/0050588 A1* | 3/2011 | Li | G06F 3/0414 345/173 |
| 2011/0154268 A1 | 6/2011 | Trent et al. | |
| 2011/0169750 A1* | 7/2011 | Pivonka | B60K 35/00 345/173 |
| 2011/0193788 A1* | 8/2011 | King | G06F 3/04883 345/173 |

* cited by examiner

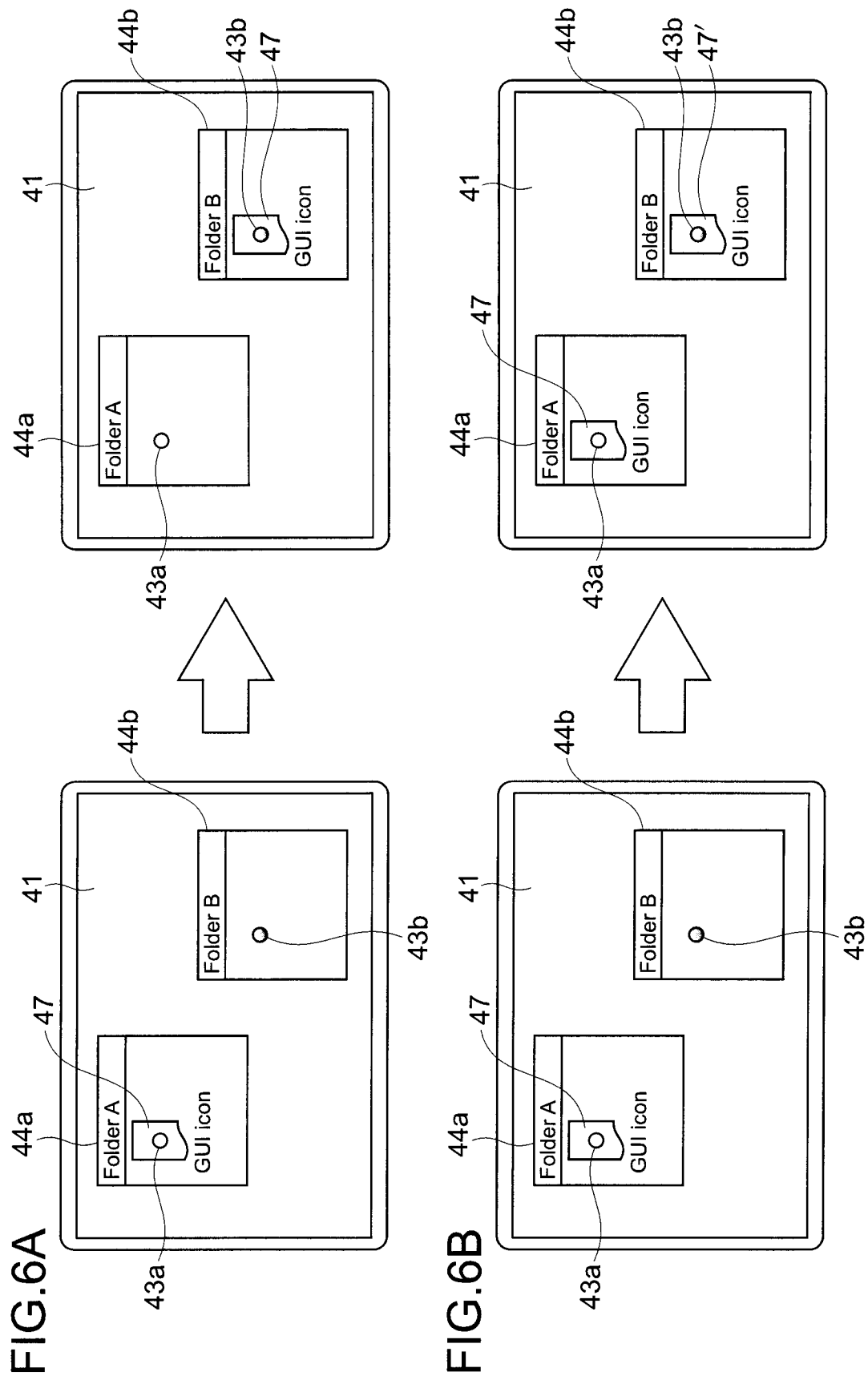

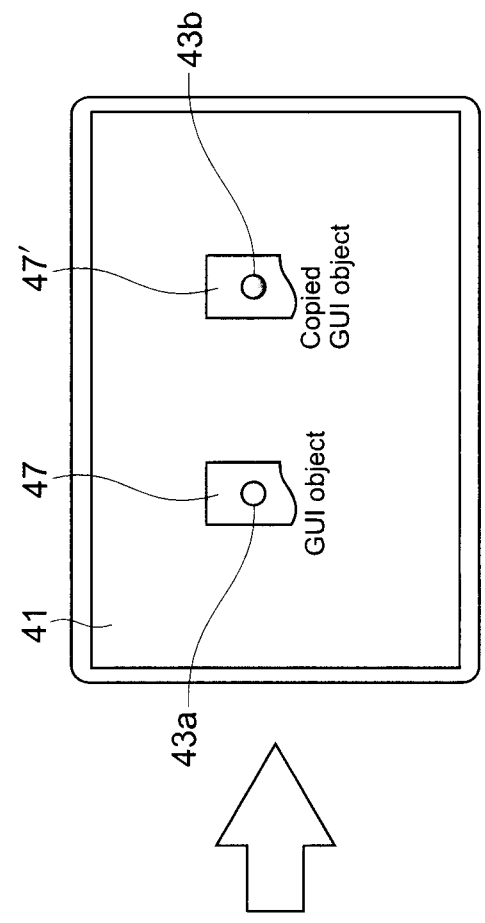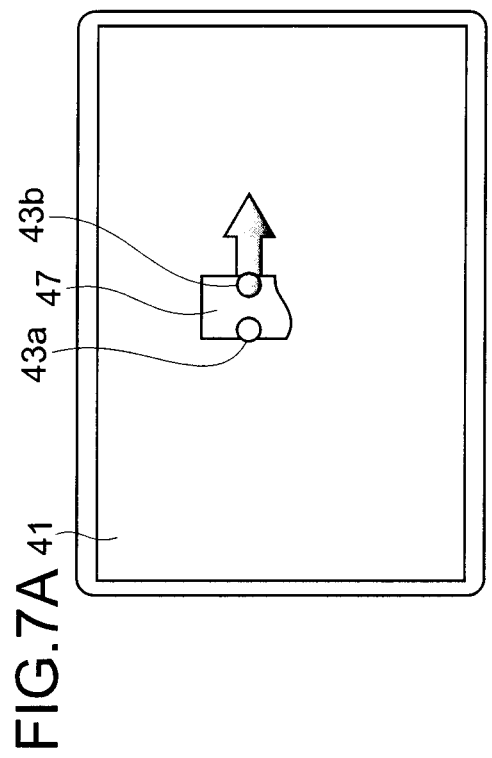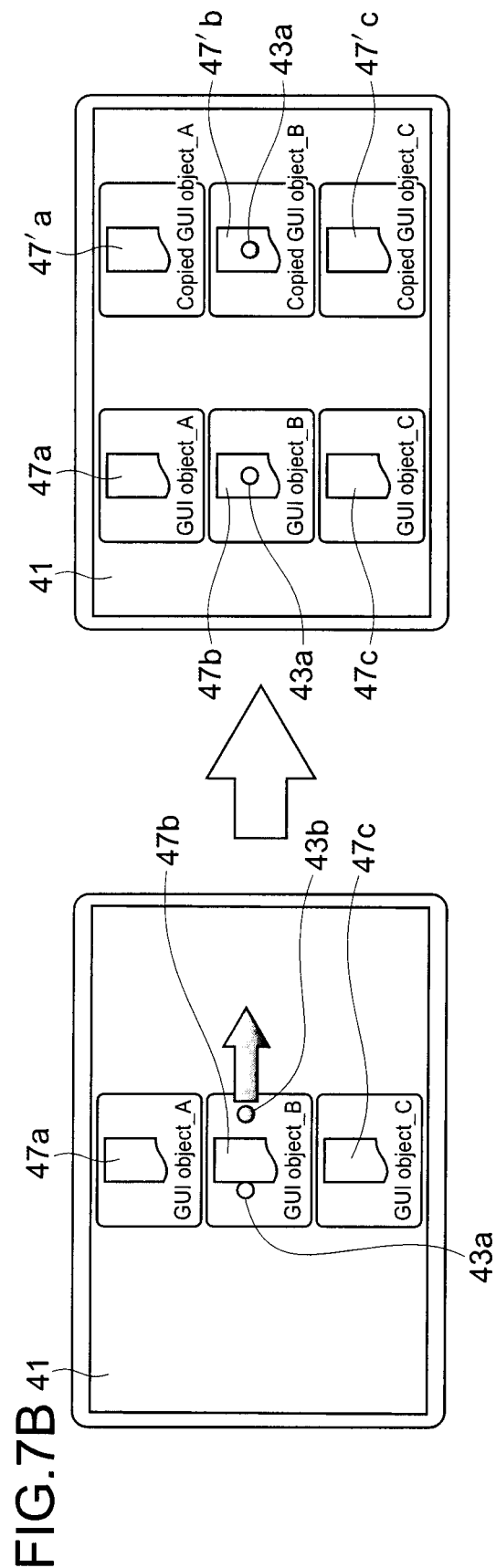
FIG.7A  FIG.7B

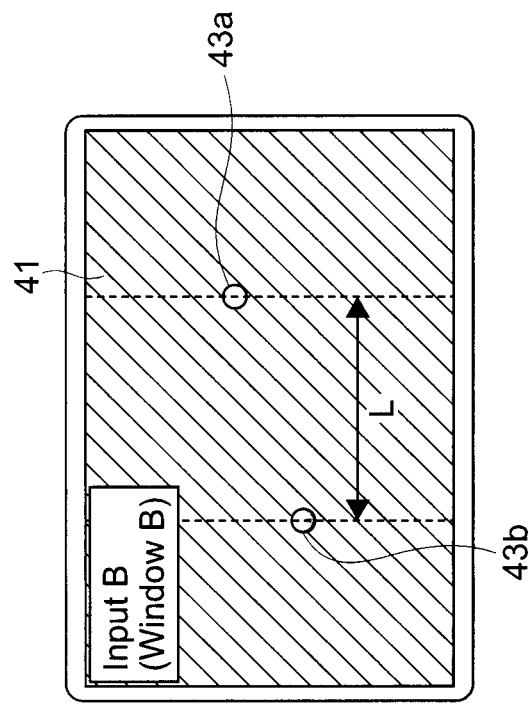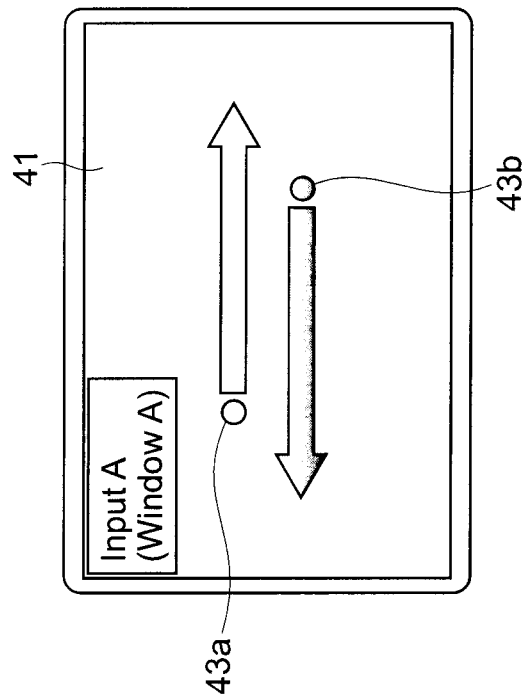
FIG.11

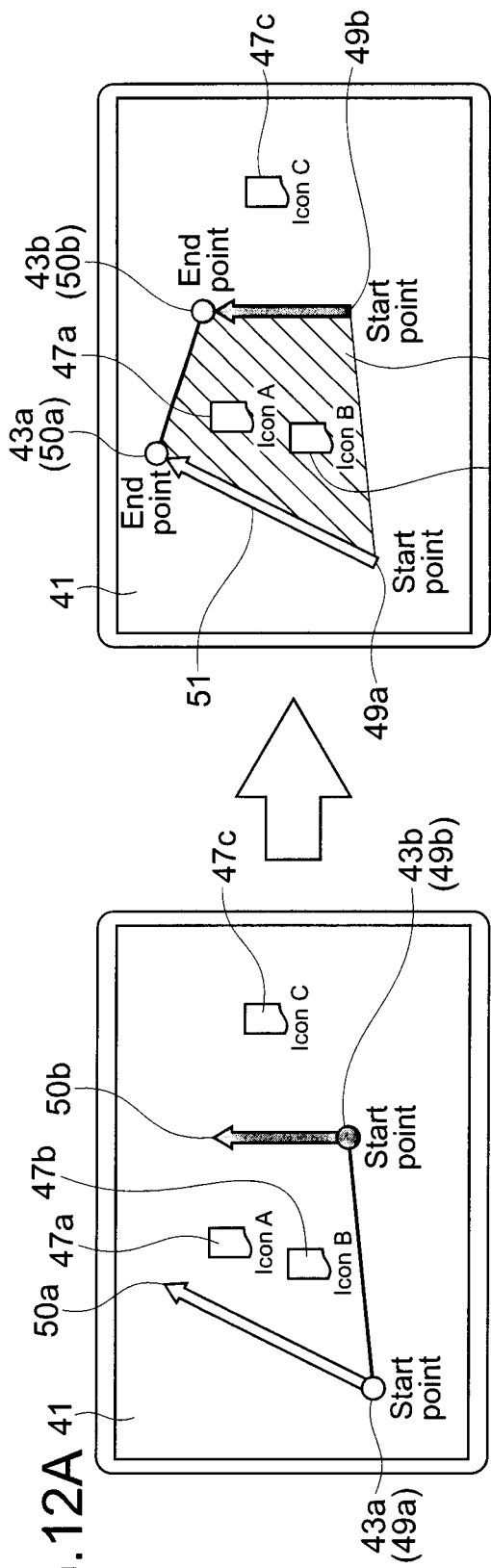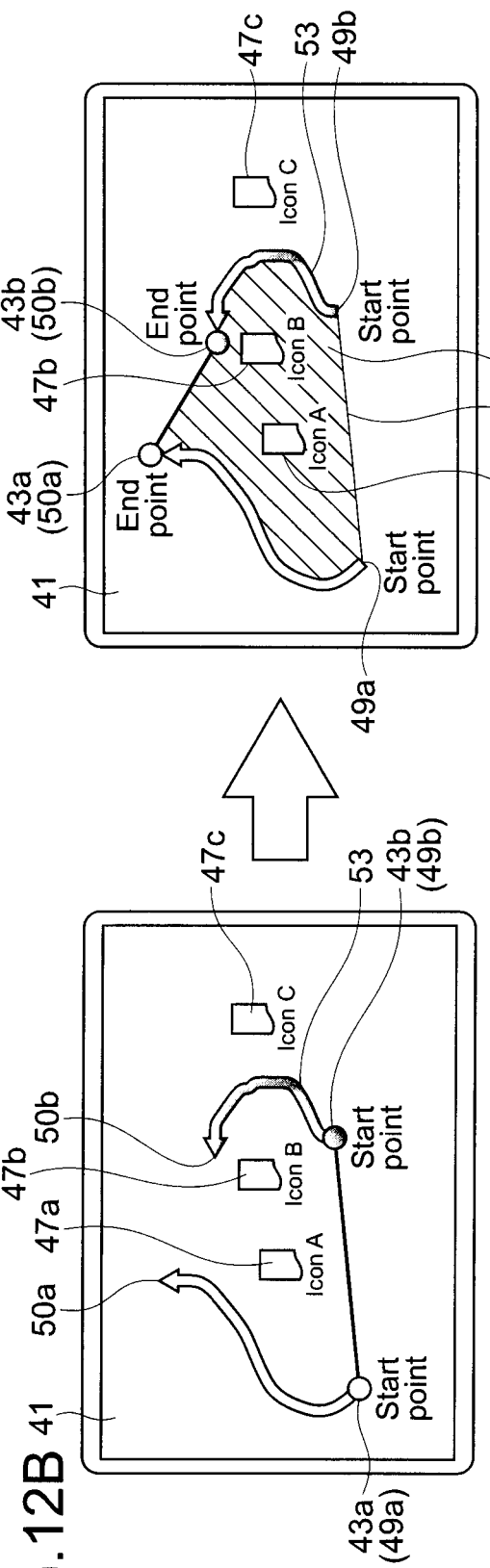

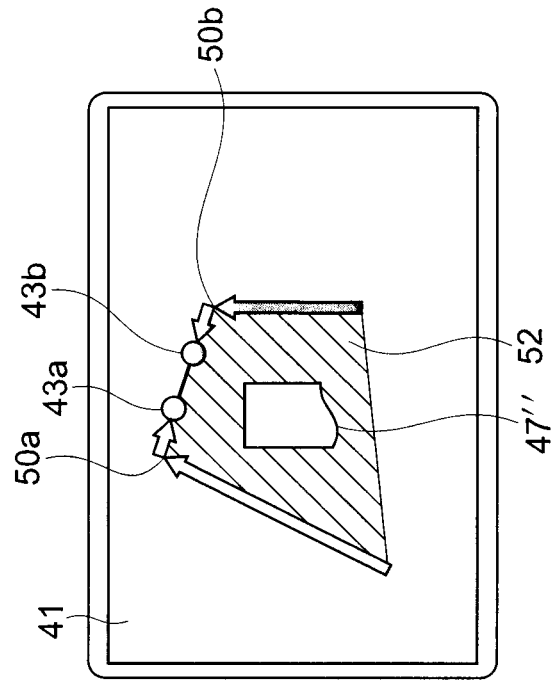
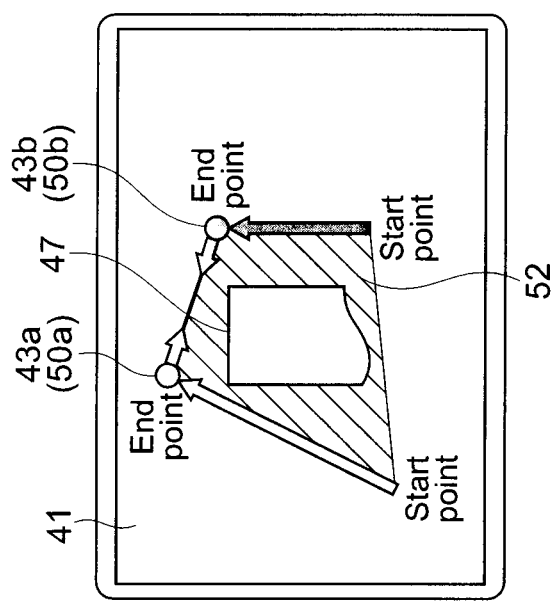
FIG.13

INFORMATION PROCESSING APPARATUS, INFORMATION PROCESSING METHOD, AND PROGRAM INPUTS TO A GRAPHICAL USER INTERFACE

CROSS REFERENCE TO PRIOR APPLICATION

This application is a continuation of U.S. patent application Ser. No. 13/297,777 (filed on Nov. 16, 2011), which claims priority to Japanese Patent Application No. 2010-268479 (filed on Dec. 1, 2010), which are all hereby incorporated by reference in their entirety.

BACKGROUND

The present disclosure relates to an information processing apparatus and an information processing method, which enable a multi-touch operation to be made, and a program therefor.

In recent years, there have been known various terminal apparatuses that enable multi-touch operations to be made. For example, Japanese Unexamined Patent Application Publication No. 2009-522669 (hereinafter, referred to as Patent Document 1) discloses a portable electronic apparatus that enables, through a multi-touch operation by a user, an enlargement operation and the like with respect to an object displayed on a display screen to be made (see paragraph [0018], FIG. 1 and the like in Patent Document 1).

SUMMARY

The use of such terminal apparatuses that enable multi-touch operations to be made will likely increase. Thus, it is desired to improve operability for users who perform the multi-touch operations.

In view of the above-mentioned circumstances, there is a need for providing an information processing apparatus and an information processing method, which enable a multi-touch operation to be made with high operability, and a program therefore. In one exemplary embodiment, the present disclosure is directed towards an apparatus comprising a memory storing instructions and a control unit executing the instructions to send signals to display first and second indicators on a display device. The control unit further executes the instructions to receive first and second user inputs and, in response to the received inputs, to send signals to change a display state of the first indicator according to the first input. The control unit further executes the instructions to send signals to change a display state of the second indicator according to the second input and initiate an operation to be performed based on a combination of the first and second inputs.

In another exemplary embodiment, the present disclosure is directed toward a method comprising sending signals to display first and second indicators on a display device. The method further comprises receiving first and second user inputs and, in response to the received inputs, sending signals to change a display state of the first indicator according to the first input. The method further comprises sending signals to change a display state of the second indicator according to the second input. The method further comprises initiating an operation to be performed based on a combination of the first and second inputs.

In another exemplary embodiment, the present disclosure is directed toward a tangibly embodied non-transitory computer-readable medium storing instructions which, when executed by a processor, perform a method comprising sending signals to display first and second indicators on a display device. The method further comprises receiving first and second user inputs. The method further comprises, in response to the received inputs, sending signals to change a display state of the first indicator according to the first input and sending signals to change a display state of the second indicator according to the second input. The method further comprises initiating an operation to be performed based on a combination of the first and second inputs.

As described above, according to the embodiments of the present disclosure, multi-touch operations with high operability become possible.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 6A and 6B are views for describing touch operations for controlling a left pointer and a right pointer and an action assigned to the touch operations;

FIGS. 7A and 7B are views for describing touch operations for controlling the left pointer and the right pointer and an action assigned to the touch operations;

FIG. 11 is a view for describing touch operations for controlling the left pointer and the right pointer and an action assigned to the touch operations;

FIGS. 12A and 12B are views for describing touch operations for controlling the left pointer and the right pointer and an action assigned to the touch operations;

FIG. 13 is a view for describing touch operations for controlling the left pointer and the right pointer and an action assigned to the touch operations;

DETAILED DESCRIPTION OF EMBODIMENTS

Hereinafter, embodiments of the present disclosure will be described with reference to the drawings.

Information Processing Apparatus

Figure 1:
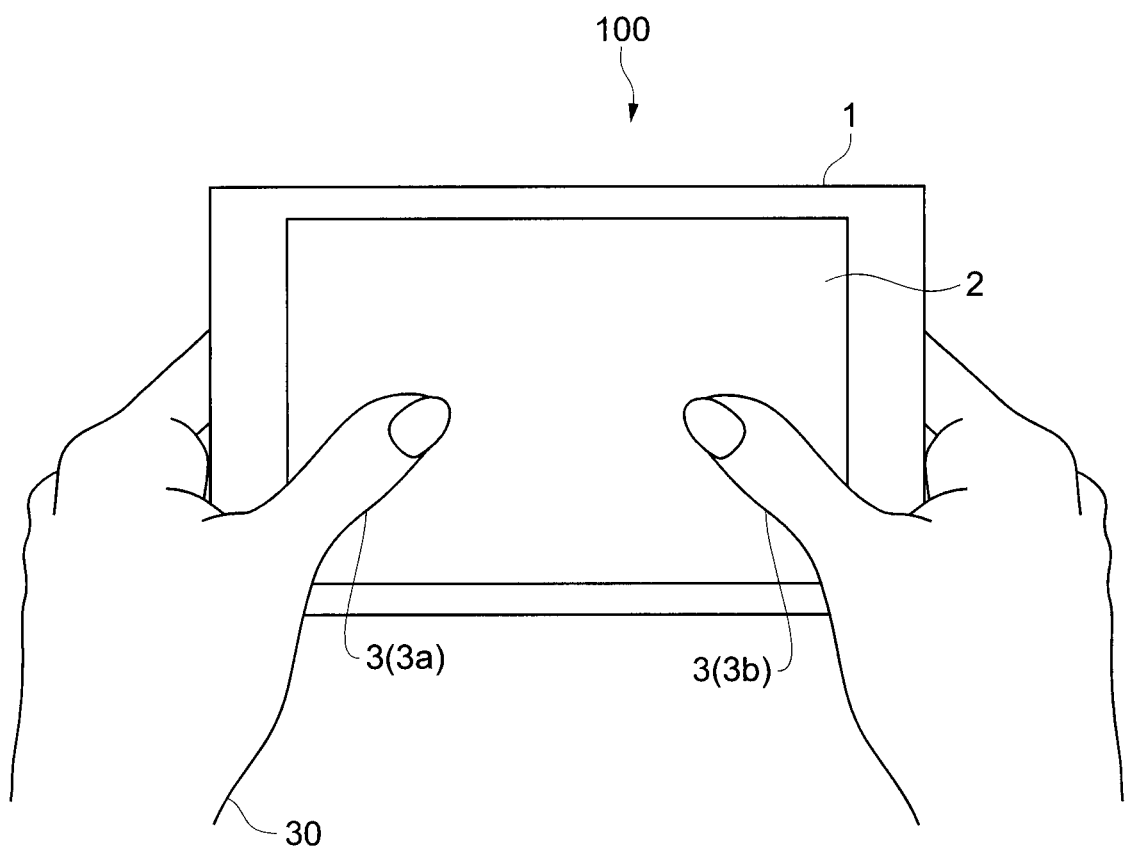
FIG. 1 is a view schematically showing an outer appearance of an information processing apparatus according to an embodiment of the present disclosure.
Figure 2:
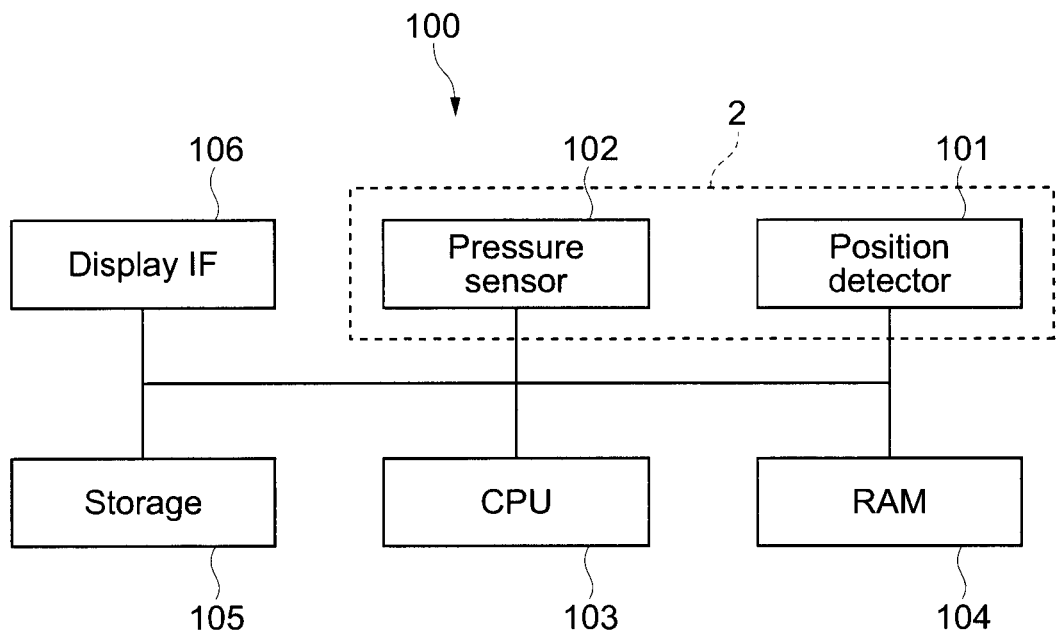
FIG. 2 is a block diagram showing a configuration example of the information processing apparatus shown in FIG. 1.

FIG. 1 is a view schematically showing an outer appearance of an information processing apparatus according to an embodiment of the present disclosure. FIG. 2 is a block diagram showing a configuration example of the information processing apparatus shown in FIG. 1.

The information processing apparatus 100 includes a casing 1 that is held by a user 30 and a touch pad 2 provided in front of the casing 1 to serve as an input unit. The touch pad 2 according to this embodiment is capable of receiving various types of multi-touch operations with one or more operators 3.

Figure 17:
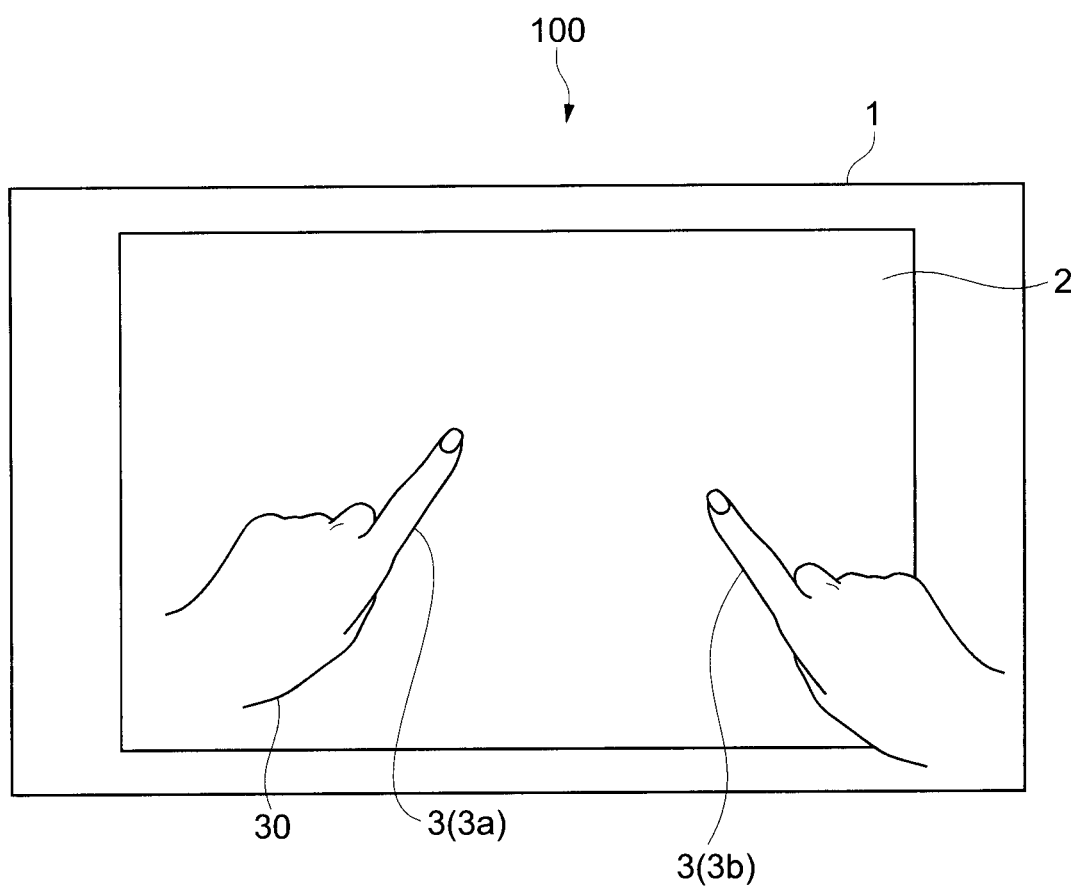
FIG. 17 is a schematic view showing another example of the information processing apparatus shown in FIG. 1.

The casing 1 is formed of, for example, metal such as aluminum and stainless steel, plastic, or other various materials. The casing 1 has such a size such that user 30 is capable of carrying the apparatus 100. For example, when seen from the user 30 in FIG. 1, the size of the casing 1 is about 15 cm in a longitudinal direction, about 10 cm in a lateral direction, and about 1 cm in thickness. However, the size of the casing 1 can be appropriately set. For example, as shown in FIG. 17, the information processing apparatus 100 including the casing 1 having a size of 30 cm or more in the longitudinal and lateral directions may be used while placed on a desk.

As shown in FIG. 1, in this embodiment, as the plurality of operators 3 serving to perform touch operations with respect to the touch pad 2, thumbs of the user 30 are used. However, other fingers may also be used (see FIG. 17). Alternatively, as the operators 3, a stylus, pen, joystick, or other suitable apparatus may be used.

As shown in FIG. 2, the touch pad 2 according to this embodiment includes a position detector 101 and a pressure sensor 102. The position detector 101 includes a sensor unit and an arithmetic circuit unit (not shown). When the operator 3 comes close to or in contact with the touch pad 2, the sensor unit outputs a proximity or contact signal to the arithmetic circuit unit. The arithmetic circuit unit generates, based on the output proximity or contact signal, information on a proximity or contact position of the operator 3, for example. Alternatively, information on a movement direction, movement amount, movement speed, acceleration speed, or the like of the operator 3 may be generated. In addition, information on a contact area, contact angle, or the like of the operator 3 may be generated.

As used herein, the term "touch operation" refers to various touch operations performed when the operator 3 comes close to or in contact with the touch pad 2. It should be understood that, in certain variations, the operator 3 need not touch or make contact with touch pad 2 in order to perform a touch operation. Further, the proximity and contact positions are collectively referred to as touch position of the operator 3.

As mentioned above, the touch pad 2 according to this embodiment is a touch pad of a so-called multi-touch type. Thus, it is possible to detect touch operations by the operators 3 with respect to the touch pad 2. For example, the user 30 can perform a pinch operation with two fingers. The pinch operation is, for example, an operation of bringing the two fingers into contact with the touch pad 2 at the same time and opening or closing the two fingers or the like while keeping the in-contact state. Here, the operation of opening the two fingers or the like held in contact with the touch pad 2 is referred to as pinch-out operation. Meanwhile, the operation of closing the two fingers or the like held in contact with the touch pad 2 is referred to as pinch-in operation.

The pressure sensor 102 serves to detect whether or not the touch pad 2 is pressed by the operator 3. For example, when the pressure sensor 102 detects the pressing force above a threshold level, it is determined that the touch pad 2 is pressed. A method of determining existence, absence of pressure, change in pressure, or amount of pressure by the pressure sensor 102, the structure of the pressure sensor 102, a method of detecting the pressing force, and the like can be appropriately set.

In this embodiment, the touch pad 2 of a capacitive type is used. However, a touch pad of another type, such as, for example, a resistive touch pad, a surface acoustic wave touch pad, and an infrared touch pad may be used instead.

Alternatively, or in addition to touch pad 2, a "touch operation" may be detected by any suitable method and/or by using any suitable apparatus. For example, various optical detection apparatuses (e.g., cameras, electric eyes or other light-sensing devices) may be used to sense a "touch operation" or any of the other operations discussed herein. Also, detection apparatuses that detect infrared radiation or other radiation outside of the visible spectrum may be used to sense a "touch operation" or any of the other operations discussed herein. These devices may be used in conjunction with other equipment that may, for example, aid in sensing the location of the user's fingers, stylus or other user control apparatus (e.g., gloves may be used to enhance the visual signature of the user's fingers, for example).

Further, as shown in FIG. 2, the information processing apparatus 100 includes a control unit such as a CPU (Central Processing Unit) 103, a RAM (Random Access Memory) 104, a storage 105, and a display interface 106.

The storage 105 is a non-volatile storage device. For example, the storage 105 may be an HDD (Hard Disk Drive), a flash memory, or other solid-state memories. A part or all of the RAM 104 and the storage 105 corresponds to a storage means according to this embodiment. Alternatively, the information processing apparatus 100 may include a ROM (Read Only Memory) (not shown), and thus the storage means may include the ROM.

The display interface 106 serves to connect the information processing apparatus 100 to a display apparatus 40 (see FIG. 3) including a display screen 41. Via the display interface 106, image data of still images, moving images, and the like, control signals for controlling the operation of the display apparatus 40, and the like are output. The image data, the control signals, and the like are output to the display apparatus 40 in a wireless or wired manner.

The information processing apparatus 100 may be provided with a drive unit and a communication unit (not shown). The drive unit may be, for example, a device capable of driving a removable recording medium such as an optical recording medium, a floppy (registered trademark) disc, a magnetic recording tape, and a flash memory.

The communication unit may be, for example, a modem, a router, and other communication apparatuses for communicating with other devices that are capable of connecting to a LAN (Local Area Network), a WAN (Wide Area Network), and the like. The communication unit may communicate in a wired or wireless manner.

Data processing by the information processing apparatus 100 is realized by software stored in the storage 105 or the like in cooperation with hardware resources of the information processing apparatus 100. For example, by the CPU 103 loading a program of instructions stored in the storage 105 or the like into the RAM 104 and executing it, various types of data processing are realized. In this embodiment, the CPU 103 functions as a first display processor, a second display processor, and an action executing unit. It should be noted that the RAM 104 may include a video RAM (VRAM) (not shown) for displaying images.

Figure 3:
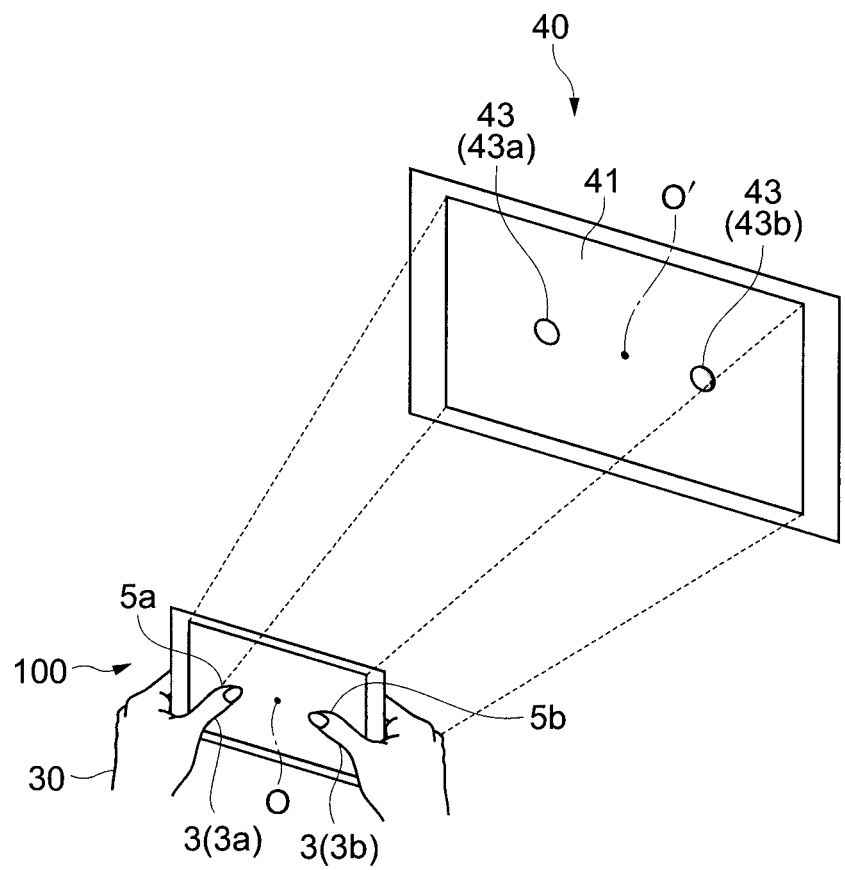
FIG. 3 is a view schematically showing the information processing apparatus shown in FIG. 1 and a display apparatus connected thereto.

FIG. 3 is a view schematically showing the information processing apparatus 100 and the display apparatus 40 connected thereto. As shown in FIG. 3, a plurality of cursor pointers 43 are displayed on the display screen 41. The plurality of cursor pointers 43 are displayed as the CPU 103 serving as the second display processor outputs display signals of the cursor pointers 43 to the display apparatus 40.

In this embodiment, a cursor pointer 43a and a cursor pointer 43b may be displayed on the display screen 41. The cursor pointer 43a is, for example, operated mainly by the left operator 3a being a left finger or the like. Further, the cursor pointer 43b is, for example, operated mainly by the right operator 3b being a right finger or the like. That is, operations for each cursor pointer, which respectively control those two cursor pointers 43a and 43b, may be input to the touch pad 2 by the left operator 3a and the right operator 3b. Hereinafter, the cursor pointer 43a is referred to as the left pointer 43a and the cursor pointer 43b is referred to as the right pointer 43b.

The left pointer 43a and the right pointer 43b may be displayed in different colors, or exhibit different shading as shown in FIG. 3, for example, so that the pointers can be discriminated from each other. With this, the pointers 43a and 43b can be operated with high operability. In order to discriminate the pointers 43a and 43b from each other, the shape, size, or the like of the pointers 43a and 43b may be appropriately set. However, the pointers 43a and 43b may be displayed in an indiscriminable manner.

In this embodiment, a coordinate system may be set with a center O of the touch pad 2 being a reference. Coordinate information including information of positional coordinates of the operators 3a and 3b in that coordinate system is output to the display apparatus 40. In the display apparatus 40, a coordinate system may be set with a center O' of the display screen 41 being a reference. In the coordinate system, based on the coordinate information received from the information processing apparatus 100, the pointers 43a and 43b are displayed at positions corresponding to touch positions 5a and 5b of the operators 3, respectively. The coordinate systems may be appropriately set in the touch pad 2 and the display screen 41.

Operation of Information Processing Apparatus

Figure 4:
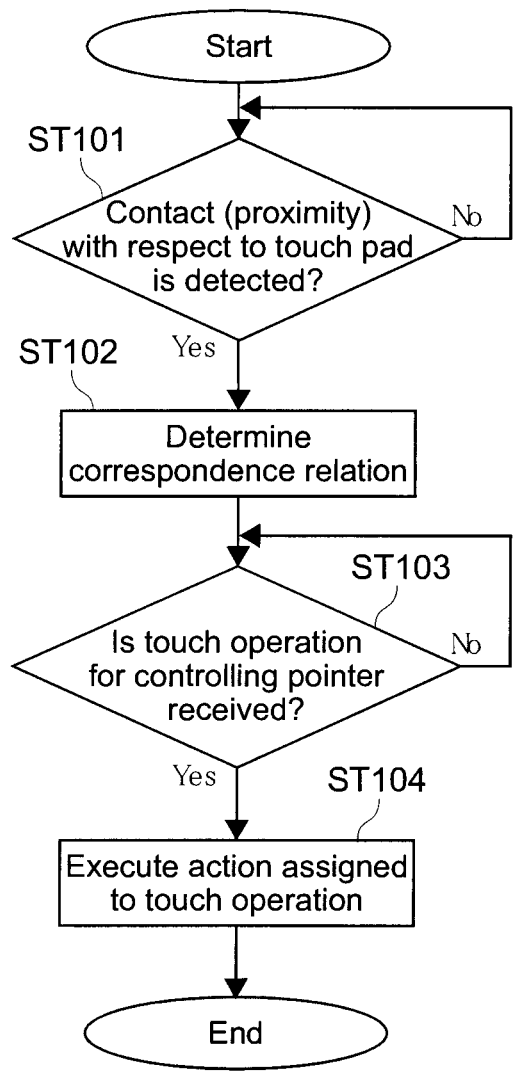
FIG. 4 is a flowchart showing an operation of the information processing apparatus shown in FIG. 1.

An operation of the information processing apparatus 100 according to this embodiment will be described. FIG. 4 is a flowchart showing the operation.

It may be determined whether or not a contact or proximity of the operator 3 with respect to the touch pad 2 is detected as an initial input operation (Step 101). When the contact or the like with the touch pad 2 is detected ("Yes" in Step 101), a correspondence relation between the operator 3 and the cursor pointer 43 displayed on the display screen 41 is determined.

Figure 5:
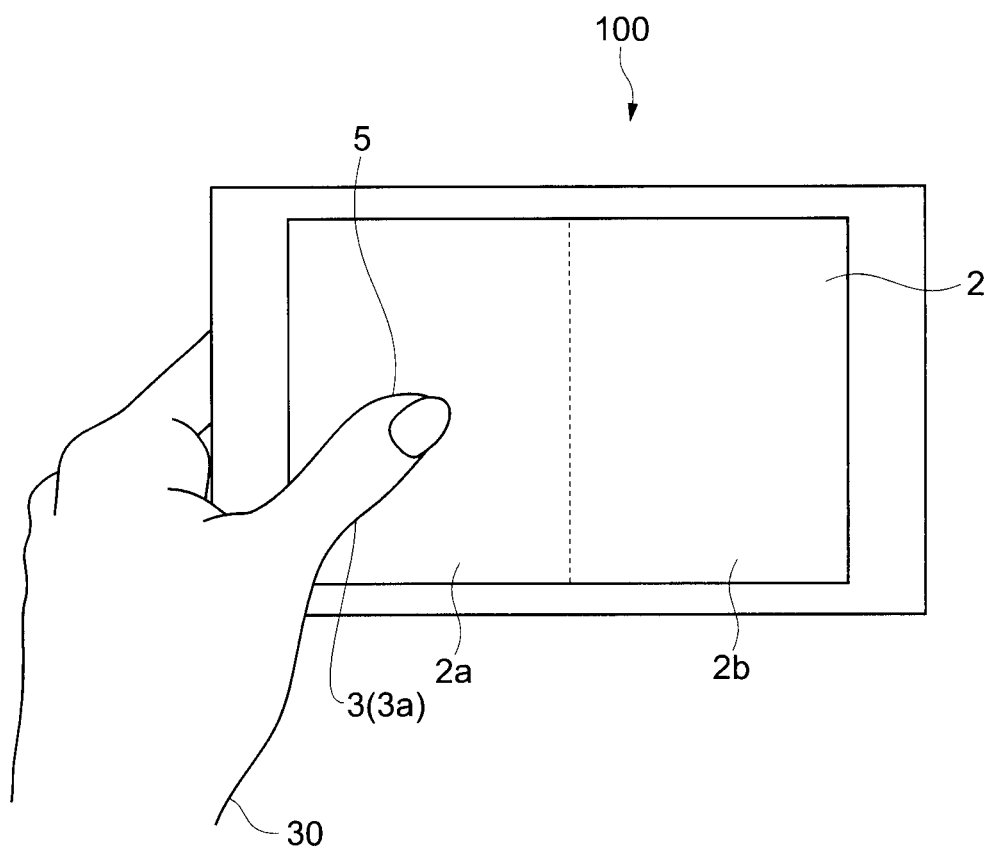
FIG. 5 is a view for describing an example of a method of determining a correspondence relation between an operator and a cursor pointer shown in FIG. 3.

FIG. 5 is a view for describing an example of a method of determining the correspondence relation between the operator 3 and the cursor pointer 43. In this embodiment, based on a touch position 5 of the operator 3 with respect to the touch pad 2, the correspondence relation is determined.

For example, as shown in FIG. 5, the touch pad 2 may be divided into the left area 2a and the right area 2b. When the touch position 5 of the operator 3 is located within the left area 2a, the operator 3 and the left pointer 43a may be caused to correspond to each other. Thus, the operator 3 functions as the left operator 3a. The left pointer 43a is displayed at a position on the display screen 41, which corresponds to the touch position 5 of the left operator 3a. When the touch position 5 of the operator 3 is located within the right area 2b, the operator 3 and the right pointer 43b may be caused to correspond to each other.

After the left operator 3a and the left pointer 43a are caused to correspond to each other, a contact or the like of the other operator 3 with the touch pad 2 may be detected. In this case, irrespective of a touch position 5 of the other operator 3, the operator 3 and the right pointer 43b may be caused to correspond to each other. Thus, the operator 3 functions as the right operator 3b. The right pointer 43b is displayed at a position on the display screen 41, which corresponds to the touch position 5 of the right operator 3b.

Thus, in this embodiment, the touch pad 2 is divided into the left area 2a and the right area 2b. With respect to the initial input operation on the left area 2a, the operator is caused to correspond to the left pointer 43a. On the other hand, with respect to the initial input operation on the right area 2b, the operator is caused to correspond to the right pointer 43b. This may allow the user 30 to perform intuitive operations. It should be noted that the correspondence relations between the touch positions 5 of the operators 3 and the pointers 43a and 43b are not limited to that described above and can be appropriately set. In addition, a method of setting areas for dividing the touch pad 2 can be set.

When the two operators 3 input the initial input operations almost at the same time, the correspondence relations are determined in the following manner, for example. For example, one operator 3 inputs the initial input operation on the left area 2a, and the other operator 3 inputs the initial input operation on the right area 2b. In this case, the operator 3 on the left area 2a is caused to correspond to the left pointer 43a, and the operator 3 on the right area 2b is caused to correspond to the right pointer 43b.

Within either the left area 2a or the right area 2b, the two operators 3 input the initial input operations almost at the same time. In this case, for example, the operator 3 closer to the left side of the touch pad 2 is caused to correspond to the left pointer 43a. Then, the other operator 3 is caused to correspond to the right pointer 43b.

The correspondence relations between the operators 3 and the pointers may be determined according to the order in which the initial input operations are input. For example, the operator 3 that has input the initial input operation to the touch pad 2 first is caused to correspond to the left pointer 43a. A method of determining the correspondence relations between the operators 3 and the pointers can be appropriately determined.

It is determined whether or not touch operations for respectively controlling the left pointer 43a and the right pointer 43b, which are displayed on the display screen 41, have been received (Step 103). When it is determined that the touch operations for each of the pointers 43a and 43b have been received ("Yes" in Step 103), an action assigned to a combination of the touch operations is executed (Step 104).

FIGS. 6A to 13 are views for describing examples of the touch operations for respectively controlling the left pointer 43a and the right pointer 43b and actions assigned to combinations of the touch operations.

As shown in FIG. 6A, an icon 47 as a GUI object is displayed on the display screen 41. The icon 47 is displayed as the CPU 103 serving as the first display processor outputs a display signal of the icon 47 to the display apparatus 40. Further, on the display screen 41, a window 44a of a folder A storing the icon 47 and a window 44b of another folder B are displayed.

The icon 47 is designated by the left pointer 43a serving as a first pointer. At this time, in order to express that the icon 47 has been designated by the left pointer 43a, a frame, a color, or the like may be applied to the icon 47. As shown in FIG. 6A, the right pointer 43b serving as a second pointer is located within the window 44b of the folder B.

In this state, the left operator 3a and the right operator 3b perform click operations almost at the same time. Consequently, as an action assigned to a combination of the click operations, movement processing of the icon 47 to a position of the right pointer 43b is executed. With this, an instant drag and drop operation is realized. It should be noted that instead of the click operations, other touch operations (e.g., double click operations, operations including any number of clicks, tap, double tap, operations including any number of taps, drag operations, etc. may be input in order to execute the movement processing of the icon 47.

As shown in FIG. 6B, as the action assigned to the click operations by the left operator 3a and the right operator 3b, copy processing of the icon 47 may be realized. At the position of the right pointer 43b, that is, within the folder B, a copy 47' of the icon 47 is created. Alternatively, the click operations by the left operator 3a and the right operator 3b may be assigned with the movement processing shown in FIG. 6A. Moreover, double click operations by the left operator 3a and the right operator 3b may be assigned with the copy processing shown in FIG. 6B.

Every time the left operator 3a and the right operator 3b perform click operations, an indication indicating the movement processing and an indication indicating the copy processing may be displayed on the display screen 41. Then, by moving the operators 3a and 3b away from the touch pad 2, the processing displayed at that time may be executed as the action.

As shown in FIGS. 6A and 6B, the left pointer 43a designates the icon 47. Then, the right pointer 43b determines the destination position. In this manner, the icon 47 can be moved with high operability. Further, the right pointer 43b determines the display position for the copy 47', and hence the icon 47 can be copied with high operability.

It should be noted that the right pointer 43b may designate the icon 47. Further, the left pointer 43a may determine the destination position for the icon 47 or the display position for the copy 47'. Further, in FIGS. 6A and 6B, the icon 47 is stored in the folder A, and the right pointer 43b is located within the window 44b of the folder B. However, the icon 47 may be stored on a desk top. Alternatively, the right pointer 43b may be located on the desk top. In either case, the movement processing or copy processing may be executed as described above.

As shown in FIG. 7A, the icon 47 is displayed on the display screen 41. The icon 47 is designated by the left pointer 43a serving as a first cursor pointer and the right pointer 43b serving as a second cursor pointer.

In this state, the right operator 3b is moved with the left operator 3a and the right operator 3b being pressed against the screen, so that a relative distance between the operators 3a and 3b may be increased. Thus, the right pointer 43b moves on the display screen 41 so that the left pointer 43a and the right pointer 43b move away from each other. At this time, as the action assigned to a combination of the touch operations, copy processing of the icon 47 is executed.

As shown in FIG. 7A, the created copy 47' moves together with the right pointer 43b. When the pressing of the operators 3a and 3b is released, the movement of the copy 47' is terminated.

As shown in FIG. 7B, the left pointer 43a and the right pointer 43b designate a plurality of icons 47a to 47c at the same time. By moving the right pointer 43b, copy processing may be executed with respect to the plurality of icons 47a to 47c at the same time. It should be noted that in FIGS. 7A and 7B, when the right pointer 43b is moved, the copy processing may be executed. However, the copy processing may be executed when the left pointer 43a is moved.

Figure 8:
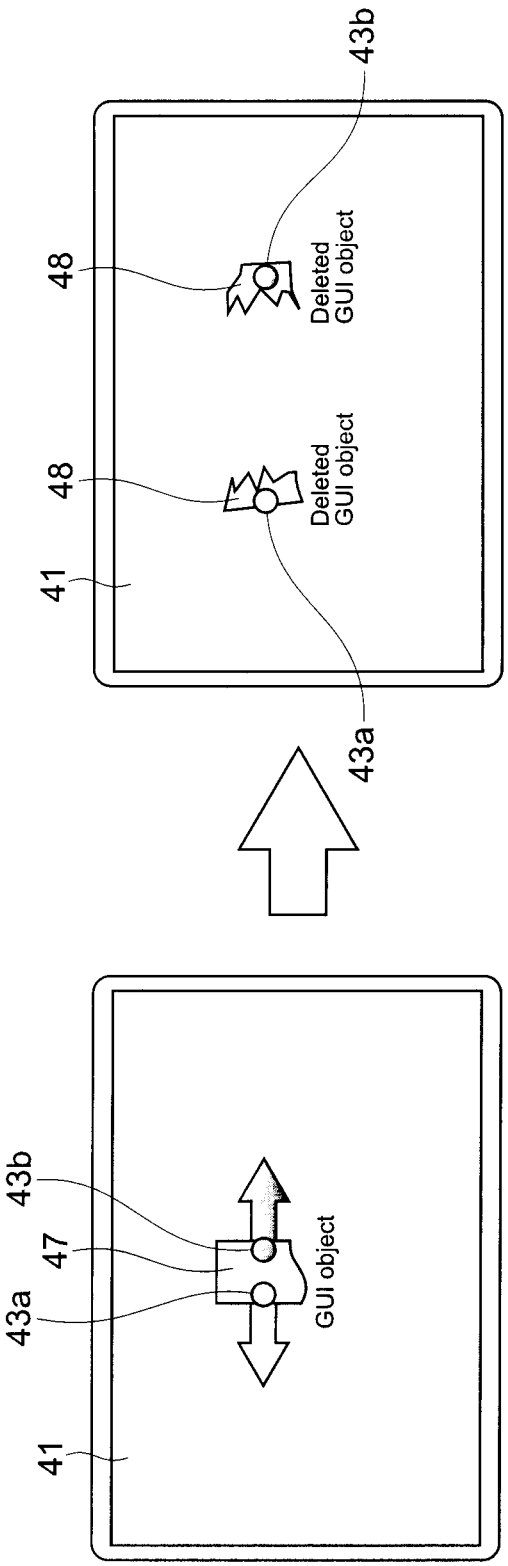
FIG. 8 is a view for describing touch operations for controlling the left pointer and the right pointer and an action assigned to the touch operations.

As shown in FIG. 8, the left pointer 43a and the right pointer 43b designate the icon 47. In this state, the operators 3a and 3b are moved with the operators 3a and 3b being pressed against the screen, so that a relative distance between the operators 3a and 3b is increased. Thus, the left pointer 43a and the right pointer 43b move away from each other on the display screen 41. At this time, deletion processing of the icon 47 is executed as the assigned action.

In this embodiment, images 48 obtained by separating the icon 47 into two are displayed on the display screen 41. With this, it is possible to visually recognize that the deletion processing has been executed. It should be noted that the moved operators 3a and 3b are moved back to their original positions with the operators 3a and 3b being pressed against the screen. Specifically, when the pointers 43a and 43b are moved back to their original positions, execution of the deletion processing may be cancelled.

As shown in FIG. 7B, the left pointer 43a and the right pointer 43b designate the plurality of icons 47a to 47c at the same time. In this state, the pointers 43a and 43b are moved. In this manner, the deletion processing may be executed on the plurality of icons 47a to 47c at the same time.

The pointers 43a and 43b are moved away from each other in the left- and right-hand directions on the display screen 41. At this time, the copy processing shown in FIGS. 7A and 7B may be executed. Then, the pointers 43a and 43b are moved away from each other in upper and lower directions on the display screen 41. At this time, the deletion processing shown in FIG. 8 may be executed.

As shown in FIGS. 7A-8, the icon 47 is designated by the left pointer 43a and the right pointer 43b. When the right pointer 43b is moved so that the pointers 43a and 43b are moved away from each other from such a state, the copy processing of the icon 47 is executed. With this, the icon 47 can be copied with relative ease and high operability. Further, when the pointers 43a and 43b are moved away from each other, the deletion processing of the icon 47 is executed. With this, the icon 47 can be deleted with high operability.

Figure 9:
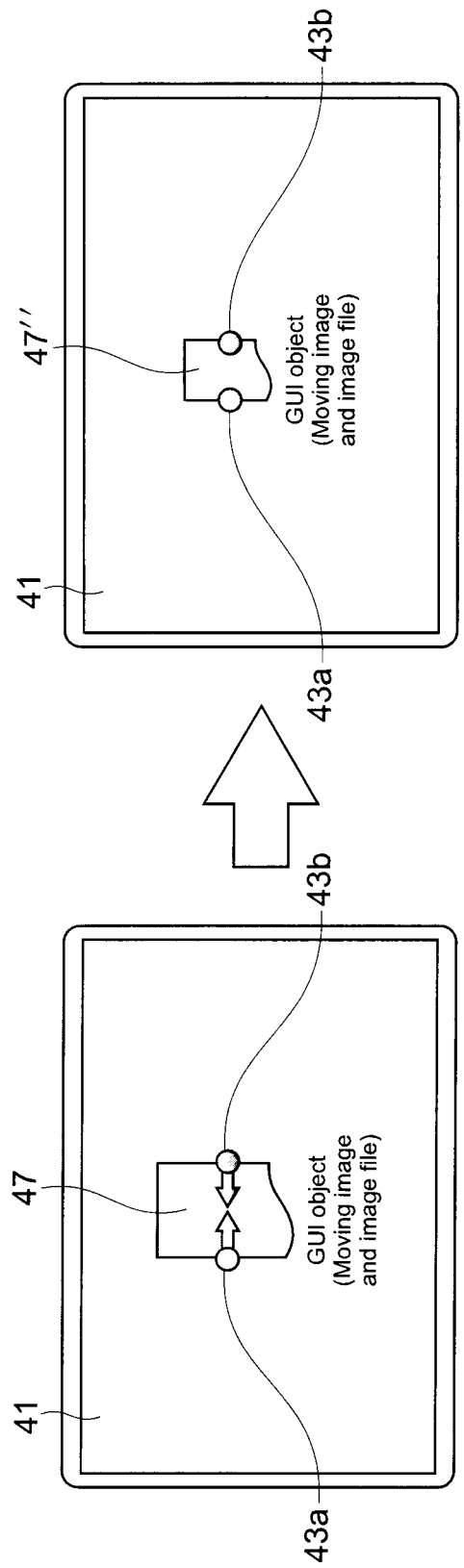
FIG. 9 is a view for describing touch operations for controlling the left pointer and the right pointer and an action assigned to the touch operations.

As shown in FIG. 9, the icon 47 of an image file is displayed on the display screen 41. The icon 47 is designated by the left pointer 43a serving as the first cursor pointer. Further, the icon 47 is designated by the right pointer 43b serving as the second cursor pointer.

In this state, the operators 3a and 3b are moved relative to each other with the left operator 3a and the right operator 3b being pressed against the screen so that a relative distance between the operators 3a and 3b is decreased. At this time, only one or both of the operators 3a and 3b may be moved. The pointers 43a and 43b are moved relative to each other on the display screen 41 so that the left pointer 43a and the right pointer 43b approach each other. At this time, compression processing of the image file as data related to the icon 47 is executed as the action.

Compression rate for the image file to be compressed may depend on an amount of change of the relative distance between the pointers 43a and 43b. For example, the compression rate may be set such that it becomes higher as the pointers 43a and 43b approach relative to each other. Alternatively, when the pointers 43a and 43b are moved relative to each other, the image file may be compressed at a compression rate.

The data to be compressed is not limited to the image file; and a moving image file, an audio file, or the like may be compressed. Further, a compression method and the like can be appropriately set. As shown in FIG. 9, an icon 47" of the compressed image file is displayed in a size smaller than that of the icon 47 of the image file before the compression. With this, the user 30 is allowed to visually recognize that the compression processing has been executed, with the result that intuitive operations become possible.

As shown in FIG. 9, the icon 47 is designated by the left pointer 43a and the right pointer 43b. When the pointers 43a and 43b are moved relative to each other so that the pointers 43a and 43b approach each other from such a state, the compression processing of the data related to the icon 47 is executed. With this, the data related to the icon 47 can be compressed with high operability.

Figure 10:
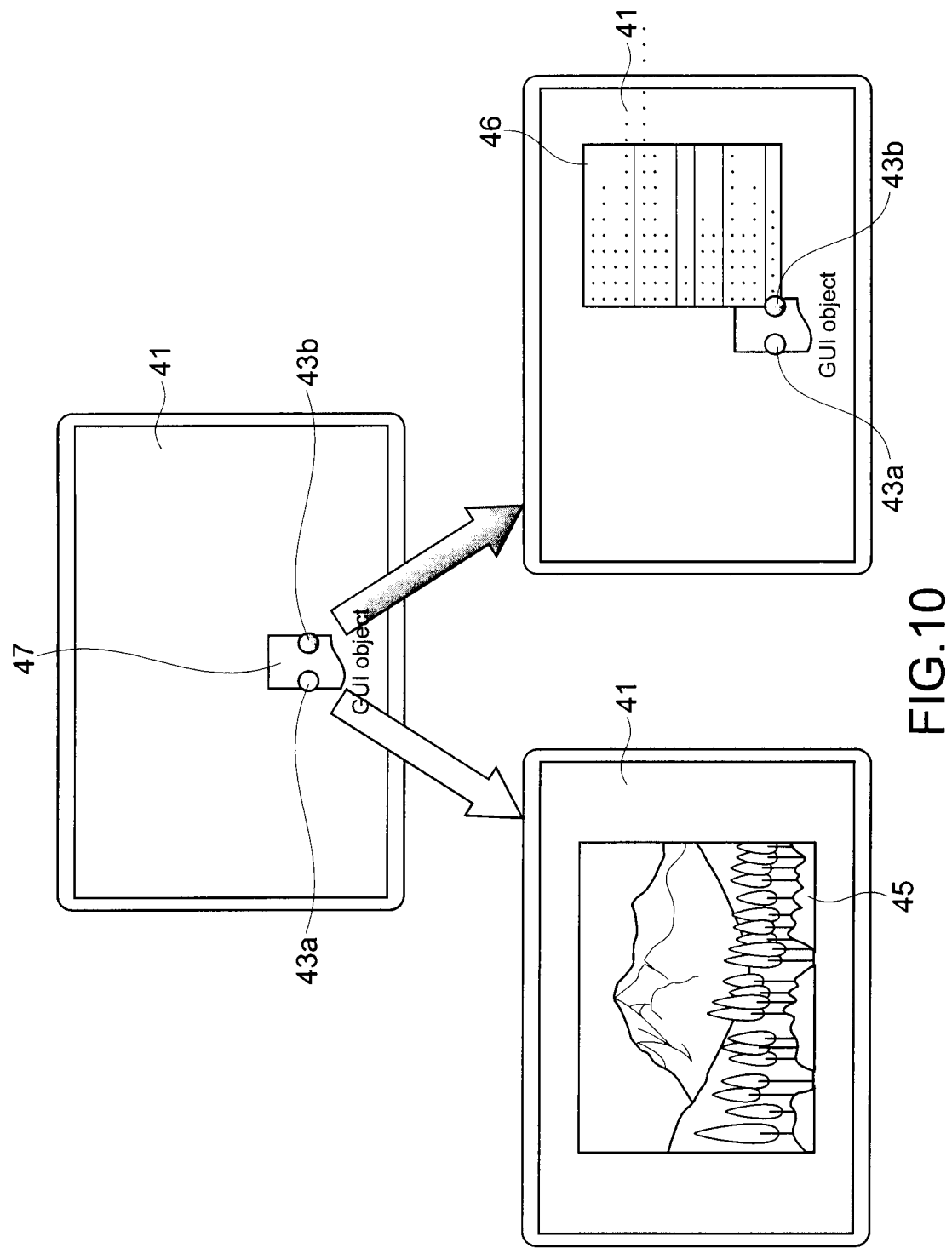
FIG. 10 is a view for describing touch operations for controlling the left pointer and the right pointer and an action assigned to the touch operations.

As shown in FIG. 10, the icon 47 of the image file is displayed on the display screen 41. The icon 47 is designated by the left pointer 43a serving as the first cursor pointer. In this state, the left operator 3a performs a click operation. Then, as a first action assigned to this click operation, reproduction processing of the image file is executed. As shown in FIG. 10, an image 45 is displayed on the display screen 41.

As shown in FIG. 10, the icon 47 is designated by the right pointer 43b serving as the second cursor pointer. In this state, the right operator 3b performs a click operation. Then, as a second action assigned to this click operation, a context menu 46 related to the icon 47 is displayed. In the context menu 46, various processing items that will be executed with respect to the image file are displayed. For example, in the context menu 46, items of the reproduction processing, print processing, copy processing, cut processing, deletion processing, and the like are displayed.

FIG. 10 shows a state in which the icon 47 is designated by the left pointer 43a and the right pointer 43b. However, either the left pointer 43a or the right pointer 43b may designate the icon 47. Then, the operator 3a or 3b may perform the click operation.

As shown in FIG. 10, when the click operation is input as an operation with respect to the left pointer 43a designating the icon 47, reproduction processing of the image file is executed. Then, when the same click operation is input with respect to the right pointer 43b designating the icon 47, display processing of the context menu 46, which is different from the reproduction processing, is executed. That is, for each of the pointers 43a and 43b, an action corresponding to an operation can be appropriately set. With this, multi-touch operations with high operability become possible. Further, different processing can be executed with respect to the same operations, and hence various types of processing can be executed without a need of complicated operations.

As the operation with respect to the left pointer 43a or the right pointer 43b, there are exemplified various touch operations such as a click operation, a double click operation, a tap operation, and a drag operation. As the action to be assigned to the operation, there are exemplified various types of processing with respect to various GUIs displayed on the display screen 41, such as designation, movement, enlargement, reduction in size, rotation, and deletion of the object displayed on the display screen 41, and reproduction of the data related to the object.

The operation using only the left operator 3a or the right operator 3b alone may be classified as a combination with a non-operation by the other operator.

As shown in FIG. 11, a window A is displayed on the display screen 41. The window A is, for example, a window of a folder, a window of an application for creating mails, documents, or the like, a window of a web browser, or the like.

In this embodiment, an icon of the folder, the application, or the like is designated by the left pointer 43a or the right pointer 43b. Then, the operator 3a or 3b performs an operation such as a click operation. As a result, as shown in FIG. 10, display processing of the window A is executed as the action assigned to this click operation.

In this state, both of the operators 3a and 3b are operated so that a relative distance between the left pointer 43a and the right pointer 43b is decreased in the left- and right-hand directions on the display screen 41. Then, also after the pointers 43a and 43b are located at almost the same position in the left- and right-hand directions on the display screen 41, the pointers 43a and 43b are moved in the same direction. That is, the operators 3a and 3b are operated so that the left pointer 43a and the right pointer 43b intersect in the left- and right-hand directions on the display screen 41.

As shown in FIG. 11, until the relative distance between the pointers 43a and 43b becomes equal to or larger than a distance L after the intersection of the pointers 43a and 43b, the operators 3a and 3b are operated. Then, window switch processing of switching the window to be in a focused state is executed as the assigned action. With this, as shown in FIG. 11, the window in the focused state is switched from the window A to a window B.

As mentioned above, the window switch processing may be executed with respect to an operation of changing the relative distance between the left pointer 43a and the right pointer 43b. The operation of causing the left pointer 43a and the right pointer 43b to intersect is set assuming a physical operation of turning sheets of paper or the like. That is, the user can execute the window switch processing by intuitive operations. It should be noted that the window switch processing may be executed with respect to the operation of changing the relative distance between the pointers 43a and 43b in the upper and lower directions on the display screen 41.

As shown in FIGS. 12A-12B, a plurality of icons 47a to 47c are displayed on the display screen 41. In this state, operations of moving the left pointer 43a and the right pointer 43b are input. Then, designation processing of designating icons 47a and 47b out of the plurality of icons 47a to 47c at the same time is executed as an action assigned to combination of the above-mentioned touch operations.

In FIG. 12A, the positions of a start point 49a and an end point 50a of the left pointer 43a and the positions of a start point 49b and an end point 50b of the right pointer 43b may be calculated. Then, a designation area 52 surrounded by straight lines 51 linking the four points is determined. The icons 47a and 47b located within this designation area 52 are designated. With this, for example, as compared to the case of setting the designation area by one pointer, it is possible to easily set a larger area as the designation area 52 with high operability.

In FIG. 12B, positional information representing movement tracks of the pointers 43a and 43b is calculated. By a straight line 51 linking the start points 49a and 49b, a straight line 51 linking the end points 50a and 50b, and a curved line 53 representing tracks of the pointers 43a and 43b, a designation area 52' is set. The icons 47a and 47b located within this designation area 52' are designated. With this, according to the positions of the plurality of icons 47a to 47c displayed on the display screen 41, icons 47a and 47b can be designated with high operability.

It should be noted that an icon designated from the icons 47a and 47b located within the designation area 52 or 52' may be additionally selected. For example, before or after the designation area 52 or 52' is determined, attribute information of the designated icon may be set. Then, only an icon including such attribute information may be selected as the designated icon. Before or after the designation area 52 or 52' is determined, an icon is selected by the left pointer 43a or the right pointer 43b. Then, only an icon including the same attribute information as the selected icon may be designated.

As shown in FIGS. 12A-12B, by moving the left pointer 43a and the right pointer 43b, the icons 47a and 47b located within the designation area 52 (52') surrounded by the start points and the end points of the two pointers 43a and 43b may be designated. With this, the icons 47a and 47b can be designated with high operability.

As shown in FIG. 13, the left pointer 43a and the right pointer 43b determine the designation area 52, and the icon 47 of the image file is designated. Then, from the positions of the end points 50a and 50b of the pointers 43a and 43b, the pointers 43a and 43b are brought close to each other. At this time, the compression processing of the image file may be executed as the assigned action. In the case where the compression rate depends on the amount of change of the relative distance between the pointers 43a and 43b, this amount of change can be easily adjusted.

As mentioned above, in the information processing apparatus 100 according to this embodiment, the touch pad 2 receives the operations of the left pointer 43a and the right pointer 43b. Then, the action previously assigned to the combination of the operations of the pointers 43a and 43b is executed with respect to the icon 47. With this, by appropriately setting the action assigned to the combination of the operations, multi-touch operations with high operability become possible.

Further, in the information processing apparatus 100 according to this embodiment, the processing shown in FIGS. 6 to 11 can be executed. That is, when at least one pointer designates the icon 47 and the operations of the pointers 43a and 43b in this state are received, the action previously assigned to the combination of those operations is executed with respect to the designated icon 47. With this, the action with respect to the icon 47 can be executed with high operability.

As the touch operations of the pointers 43a and 43b, operations other than the touch operations shown in FIGS. 6 to 13 may be input. Further, as the action assigned to the combination of the touch operations of the pointers, an action other than the actions described above may be executed.

Additional Example

Embodiments according to the present disclosure are not limited to the above-mentioned embodiments and various modifications can be made.

Figure 14A:
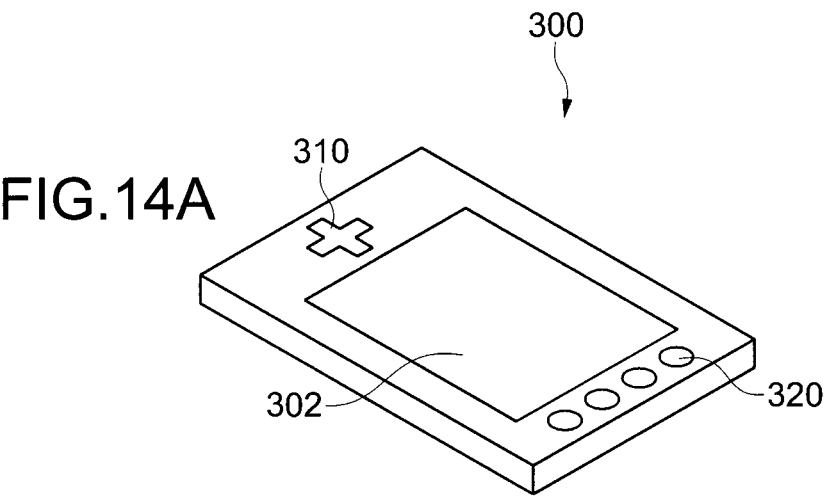
FIGS. 14A and 14B are schematic views showing a modification of the information processing apparatus shown in FIG. 1.

FIGS. 14A-15B are schematic views showing a modified example of the information processing apparatus 100 shown in FIG. 1. As shown in FIG. 14A, an information processing apparatus 300 includes a touch pad 302, a D-pad 310, and operation buttons 320. As shown in the figure, the information processing apparatus 300 may be provided with the operation buttons 320 and the like.

Figure 14B:
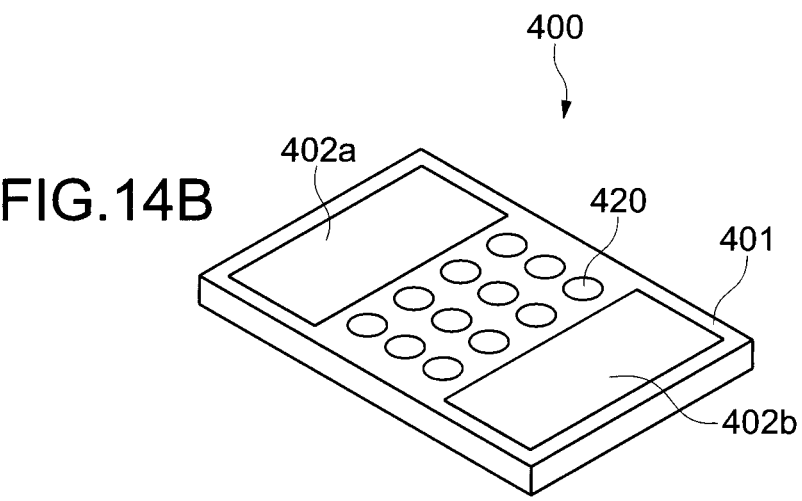

As shown in FIG. 14B, an information processing apparatus 400 includes a touch pad 402a and a touch pad 402b. The touch pad 402a is used for a touch operation by a left operator. The touch pad 402b is used for a touch operation by a right operator. As shown in the figure, due to the provision of the plurality of touch pads for each of the operators, the correspondence relations between the operators and the pointers can be easily determined. Thus, the operations for respectively controlling the pointers can be intuitively performed with high operability. Further, in the case of using a so-called relative coordinate system, the operability of each pointer can be kept high. In the relative coordinate system, each pointer is operated based on relative coordinate information being information of the movement direction and movement amount of each pointer.

Figure 15A:
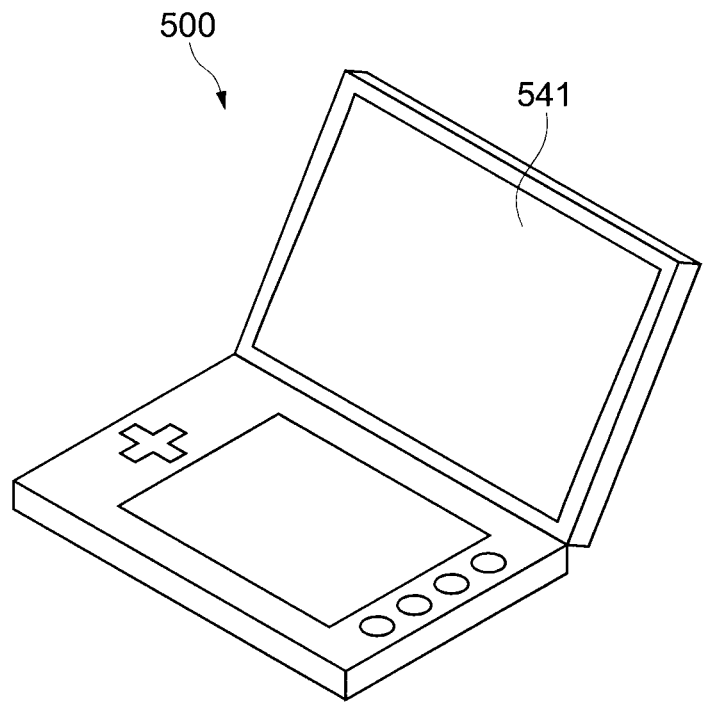
FIGS. 15A and 15B are schematic views showing a modification of the information processing apparatus shown in FIG. 1.
Figure 15B:
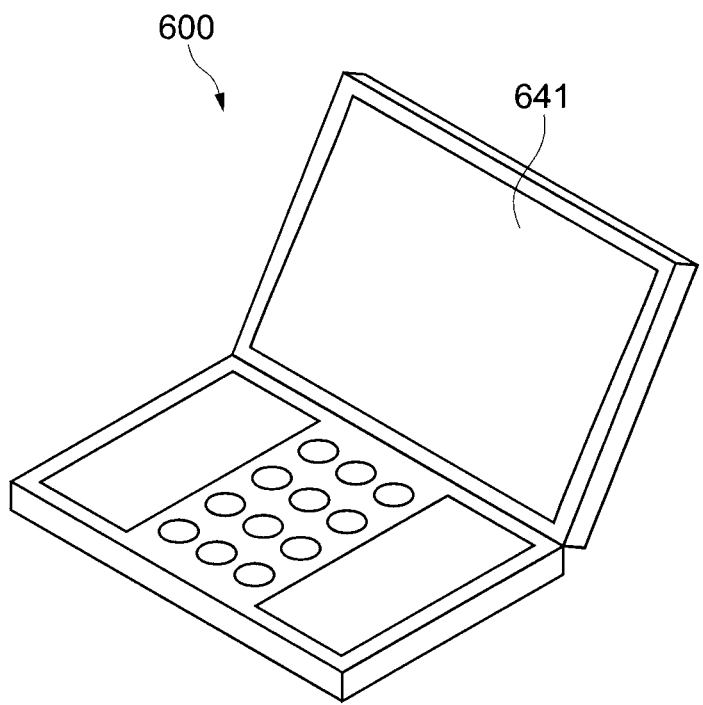

As shown in FIGS. 15A and 15B, as an information processing apparatus 500 or 600 according to a modified example of the present disclosure, an information processing apparatus including a display screen 541 or 641 may be used. The information processing apparatuses 500 or 600 is typically manufactured in a size that the user is capable of carrying.

In each of the above-mentioned embodiments, the touch pad serving as the input unit, the CPU, and the like are integrally provided. However, a main body including the CPU and an input controller including the touch pad may be provided separately. That is, for example, a remote controller having an outer appearance that is substantially the same as the outer appearance of the information processing apparatus 100 shown in FIG. 1 and a main body including the CPU provided separately from the controller may constitute an information processing apparatus according to an embodiment of the present disclosure.

Further, as the information processing apparatus according to this embodiment, an information processing apparatus without the touch pad may be used. In this case, to this information processing apparatus, the touch pad serving as an external input apparatus is connected in a wired or wireless manner. Then, a contact signal or the like output from this touch pad serving as the external input apparatus is received. That is, as the information processing apparatus according to this embodiment, an information processing apparatus having a structure for receiving the operation of each pointer through the external input apparatus may be used. In this case, an interface or the like provided for connection to the external input apparatus functions as the input unit.

In the above description, the touch pad serving as the input unit includes the pressure sensor. However, the touch pad does not need to include the pressure sensor and detect the pressing operations of the operators. In this case, it is only sufficient that various types of processing are executed according to operations of contact and separation of the operators. Moreover, as mentioned above, embodiments herein need not include a pressure sensor. "Touch operations" may be detected by, in addition to or alternative to pressure sensing, any other suitable methods such as by using optical or infrared detectors.

In the above description, two operators of the left operator and the right operator are illustrated. However, two or more operators may input the touch operations to the touch pad.

In the above description, in the absolute coordinate system, the operators control the cursor pointers. However, a relative coordinate system may be used. Further, when a contact or proximity with respect to the touch pad 2 is not detected for a period of time, the cursor pointer may be hidden.

In the above description, based on the touch positions of the operator or the order in which the touch operations are input, the correspondence relations between the operators and the cursor pointers are determined. However, the correspondence relations may be determined based on contact angles obtained when the operators come in contact with the touch pad. For example, the contact areas of the operators are detected, and the contact angles are calculated from the shape of each area, a change of the shape, or the like. A method of calculating the contact angles can be appropriately set.

In the touch pad 2 shown in FIG. 1, an operator comes in contact with the touch pad 2 in order to move in a direction from the left-hand side to the upper right-hand side. In this case, this operator is caused to correspond to the left pointer. An operator comes in contact with the touch pad 2 in order to move in a direction from the right-hand side to the upper left-hand side of the touch pad 2. In this case, this operator is caused to correspond to the right pointer. With this, generally, the left pointer is caused to correspond to operations by the left hand and the right pointer is caused to correspond to operations by the right hand. As a result, intuitive operations become possible.

Figure 16:
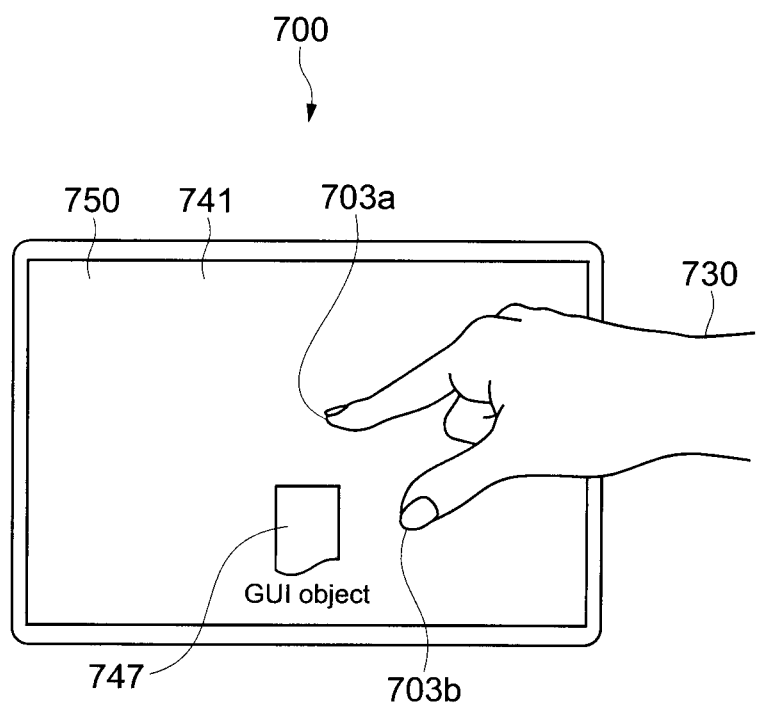
FIG. 16 is a view schematically showing a modification of variations of the present disclosure.

FIG. 16 is a view schematically showing an embodiment of the present disclosure. An information processing apparatus 700 shown in FIG. 16 includes a touch panel 750 of a multi-touch type as the input unit capable of receiving touch operations by one or more operators. Thus, no pointer needs to be displayed on a display screen 741. The user 730 inputs touch operations to the display screen 741 by use of a plurality of operators 703a and 703b. Then, with respect to an icon 747 displayed on the display screen 741, an action assigned to those touch operations is executed. With this, multi-touch operations with high operability become possible.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a first touch pad configured to detect a first input to operate a first indicator in a graphical user interface;
a second touch pad configured to detect a second input to operate a second indicator in the graphical user interface; and
at least one pressure sensor configured to detect a pressure above a threshold level applied on each of the first touch pad and the second touch pad at the same time in order to perform an operation of processing data of an underlying file corresponding to an icon displayed in the graphical user interface,
wherein an operation rate of the processing operation performed with respect to the data of the underlying file is determined according to an amount of a change of a relative distance between the first input and the second input based on movement of one of or both the first input and the second input while the pressure above the threshold level continues to be detected on both the first touch pad and the second touch pad,
wherein the first touch pad and the second touch pad are separately arranged on a surface,
wherein the first touch pad is arranged on a first side of the surface and the second touch pad is arranged on a second side of the surface, and
wherein the first indicator is mapped in a first side of the graphical user interface and the second indicator is mapped in a second side of the graphical user interface.

2. The information processing apparatus according to claim 1, further comprising:
at least one mechanical switch arranged between the first touch pad and the second touch pad.

3. The information processing apparatus according to claim 1,
wherein the first indicator and the second indicator are operated based on relative coordinate information of a movement direction and a movement amount of the movement of the first input and the second input, respectively.

4. The information processing apparatus according to claim 1,
wherein the information processing apparatus is a controller which is separated from a processor which controls a displaying of an image of the graphical user interface.

5. The information processing apparatus according to claim 1,
wherein an action for the processing operation is set according to a combination of the first input and the second input.

6. The information processing apparatus according to claim 1,
wherein a type of the processing operation is determined according to a detected change in an amount of the pressure applied.

7. The information processing apparatus according to claim 1,
wherein the processing operation is a compression operation in which a compression rate of the data of the underlying file corresponding to the icon is determined based on the amount of the change of the relative distance between the first input and the second input according to the movement of one of or both the first input and the second input while the pressure above the threshold level continues to be detected on both the first touch pad and the second touch pad.

8. The information processing apparatus according to claim 1,
wherein the processing operation comprises creating a copy of the icon, and a position of the created copy is determined according to positions of the first input and the second input when the pressure is released from both the first touch pad and the second touch pad.

9. The information processing apparatus according to claim 1,
wherein the processing operation is further determined according to a movement speed of the movement of one of or both the first input and the second input.

10. The information processing apparatus according to claim 1,
wherein the icon is selected for the processing operation according to an initial input position of one of or both the first input and the second input when the pressure above the threshold level is initially detected.

11. The information processing apparatus according to claim 1,
wherein a type of the processing operation is determined according a combination of touch operations determined based upon detecting the first input on the first touch pad and detecting the second input on the second touch pad.

12. The information processing apparatus according to claim 1,
wherein a size of the icon displayed in the graphical user interface is determined according to the amount of the change of the relative distance between the first input and the second input based on the movement of one of or both the first input and the second input while the pressure above the threshold level continues to be detected on both the first touch pad and the second touch pad.

13. An information processing method, executed via at least one processor, the method comprising:
detecting, via a first touch pad, a first input to operate a first indicator in a graphical user interface;
detecting, via a second touch pad, a second input to operate a second indicator in the graphical user interface; and
detecting a pressure above a threshold level applied on each of the first touch pad and the second touch pad at the same time in order to perform an operation of processing data of an underlying file corresponding to an icon displayed in the graphical user interface,
wherein an operation rate of the processing operation performed with respect to the data of the underlying file is determined according to an amount of a change of a relative distance between the first input and the second input based on movement of one of or both the first input and the second input while the pressure above the threshold level continues to be detected on both the first touch pad and the second touch pad,
wherein the first touch pad and the second touch pad are separately arranged on a surface of a device,
wherein the first touch pad is arranged on a first side of the surface and the second touch pad is arranged on a second side of the surface, and
wherein the first indicator is mapped in a first side of the graphical user interface and the second indicator is mapped in a second side of the graphical user interface.

14. The information processing method according to claim 13,
wherein a type of the processing operation is determined according to a detected change in an amount of the pressure applied.

15. The information processing method according to claim 13,
wherein the processing operation is a compression operation in which a compression rate of the data of the underlying file corresponding to the icon is determined based on the amount of the change of the relative distance between the first input and the second input according to the movement of one of or both the first input and the second input while the pressure above the threshold level continues to be detected on both the first touch pad and the second touch pad.

16. The information processing method according to claim 13,
wherein the processing operation comprises creating a copy of the icon, and a position of the created copy is determined according to positions of the first input and the second input when the pressure is released from both the first touch pad and the second touch pad.

17. The information processing method according to claim 13,
wherein the processing operation is further determined according to a movement speed of the movement of one of or both the first input and the second input.

18. A non-transitory computer-readable medium having embodied thereon a program, which when executed by a processor, causes the processor to execute an information processing method, the method comprising:
detecting, via a first touch pad, a first input to operate a first indicator in a graphical user interface;
detecting, via a second touch pad, a second input to operate a second indicator in the graphical user interface; and
detecting a pressure above a threshold level applied on each of the first touch pad and the second touch pad at the same time in order to perform an operation of processing data of an underlying file corresponding to an icon displayed in the graphical user interface,
wherein an operation rate of the processing operation performed with respect to the data of the underlying file is determined according to an amount of a change of a relative distance between the first input and the second input based on movement of one of or both the first input and the second input while the pressure above the threshold level continues to be detected on both the first touch pad and the second touch pad,
wherein the first touch pad and the second touch pad are separately arranged on a surface of a device,
wherein the first touch pad is arranged on a first side of the surface and the second touch pad is arranged on a second side of the surface, and
wherein the first indicator is mapped in a first side of the graphical user interface and the second indicator is mapped in a second side of the graphical user interface.

19. The non-transitory computer-readable medium according to claim 18,
wherein a type of the processing operation is determined according to a detected change in an amount of the pressure applied.

20. The non-transitory computer-readable medium according to claim 18,
wherein the processing operation is a compression operation in which a compression rate of the data of the underlying file corresponding to the icon is determined based on the amount of the change of the relative distance between the first input and the second input according to the movement of one of or both the first input and the second input while the pressure above the threshold level continues to be detected on both the first touch pad and the second touch pad.

21. The non-transitory computer-readable medium according to claim 18,
wherein the processing operation comprises creating a copy of the icon, and a position of the created copy is determined according to positions of the first input and the second input when the pressure is released from both the first touch pad and the second touch pad.

22. The non-transitory computer-readable medium according to claim 18,
wherein the processing operation is further determined according to a movement speed of the movement of one of or both the first input and the second input.

* * * * *